US011618015B2

(12) United States Patent
Yavuz et al.

(10) Patent No.: US 11,618,015 B2
(45) Date of Patent: Apr. 4, 2023

(54) DRY REFORMING CATALYST USING METAL OXIDE SUPPORT, AND METHOD FOR PREPARING SYNTHETIC GAS BY USING SAME

(71) Applicants: KOREA ADVANCED INSTITUTE OF SCIENCE AND TECHNOLOGY, Daejeon (KR); SAUDI ARABIAN OIL COMPANY, Dhahran (SA)

(72) Inventors: Cafer Tayyar Yavuz, Daejeon (KR); Ercan Ozdemir, Daejeon (KR); Youngdong Song, Daejeon (KR); Aadesh Harale, Dhahran (SA); Bandar Fadhel, Dhahran (SA)

(73) Assignees: Korea Advanced Institute of Science and Technology, Daejeon (KR); Saudi Arabian Oil Company, Dhahran (SA)

( * ) Notice: Subject to any disclaimer, the term of this patent is extended or adjusted under 35 U.S.C. 154(b) by 1104 days.

(21) Appl. No.: 16/321,028

(22) PCT Filed: Aug. 7, 2017

(86) PCT No.: PCT/KR2017/008486
§ 371 (c)(1),
(2) Date: Jan. 27, 2019

(87) PCT Pub. No.: WO2018/026246
PCT Pub. Date: Feb. 8, 2018

(65) Prior Publication Data
US 2019/0168206 A1  Jun. 6, 2019

(30) Foreign Application Priority Data

Aug. 5, 2016 (KR) .................. 10-2016-0100271
Aug. 7, 2017 (KR) .................. 10-2017-0099675

(51) Int. Cl.
*B01J 37/02* (2006.01)
*B01J 37/16* (2006.01)
(Continued)

(52) U.S. Cl.
CPC .......... *B01J 37/0203* (2013.01); *B01J 23/02* (2013.01); *B01J 23/883* (2013.01); *B01J 37/16* (2013.01);
(Continued)

(58) Field of Classification Search
CPC ...... B01J 37/0203; B01J 23/02; B01J 23/883; B01J 37/16; C01B 3/34
See application file for complete search history.

(56) References Cited

U.S. PATENT DOCUMENTS 6,402,989 B1 *  6/2002  Gaffney .............. B01J 23/755
                                                    518/703
8,575,063 B2   11/2013  Xu et al.
(Continued)

FOREIGN PATENT DOCUMENTS

CA        2877956 A1    1/2014
CN     101637726 A      2/2010
(Continued)

OTHER PUBLICATIONS

Bayrakdar, E., et al., "Effects of PVP on the Preparation of Nanosized Al2O3 Supported Ni Catalysts by Polyol Method for Catalytic Partial Oxidation of Methane", "Fuel Processing Technology", 2013, pp. 167-175, vol. 110.
(Continued)

*Primary Examiner* — James A Fiorito
(74) *Attorney, Agent, or Firm* — Hultquist, PLLC; Steven J. Hultquist

(57) ABSTRACT

The present invention relates to a dry reforming catalyst in which an active material is impregnated on the surface of a
(Continued)

metal oxide support and the active material is surrounded by a surfactant, a method of preparing the same, and a method of producing a synthetic gas using the catalyst. Since the surfactant on the surface of the active material prevents the active material from being sintered and the active material surface from being covered with carbon, the dry reforming catalyst exhibits high activity at high temperature for a long period of time without having to use a precious metal, and thus is useful for the production of a synthetic gas.

10 Claims, 8 Drawing Sheets

(51) Int. Cl.
    *B01J 23/883*      (2006.01)
    *C01B 3/34*        (2006.01)
    *B01J 23/02*       (2006.01)
(52) U.S. Cl.
    CPC ........ *C01B 3/34* (2013.01); *C01B 2203/1058* (2013.01); *C01B 2203/1082* (2013.01); *C01B 2203/1094* (2013.01); *Y02P 20/52* (2015.11)

(56) References Cited

U.S. PATENT DOCUMENTS

| | | | |
|---|---|---|---|
| 10,113,119 B2 * | 10/2018 | Heo | ....................... B01J 23/002 |
| 2006/0275194 A1 | 12/2006 | Gary | |
| 2010/0105546 A1 | 4/2010 | Xu et al. | |
| 2014/0057781 A1 | 2/2014 | Masias et al. | |
| 2016/0059217 A1 | 3/2016 | Bal et al. | |
| 2016/0082421 A1 | 3/2016 | Rajaram et al. | |
| 2016/0159714 A1 | 6/2016 | Zubrin et al. | |
| 2017/0050845 A1 | 2/2017 | Lofberg et al. | |

FOREIGN PATENT DOCUMENTS

| | | |
|---|---|---|
| CN | 103007945 A | 4/2013 |
| CN | 04801333 A | 7/2015 |
| CN | 104801333 A | 7/2015 |
| CN | 104998649 A | 10/2015 |
| CN | 105561998 A | 5/2016 |
| CN | 105688916 A | 6/2016 |
| CN | 105727972 A | 7/2016 |
| CN | 105813737 A | 7/2016 |
| CN | 106281464 A | 1/2017 |
| JP | S49111886 U | 9/1974 |
| JP | S53146989 U | 11/1978 |
| JP | 2006527065 A | 11/2006 |
| KR | 100916523 B1 | 9/2009 |
| KR | 20120010901 A | 2/2012 |
| KR | 20140111229 A | 9/2014 |
| KR | 20150133574 A | 11/2015 |
| WO | WO2013135667 A1 | 9/2013 |
| WO | WO2015103592 A1 | 7/2015 |
| WO | WO2014192499 A1 | 2/2017 |

OTHER PUBLICATIONS

Huang, T., et al., "Methane Reforming Reaction with Carbon Dioxide Over SBA-15 Supported Ni-Mo Bimetallic Catalysts", "Fuel Processing Technology", 2011, pp. 1868-1875, vol. 92.

Naeem, M.A., et al., "Hydrogen Production From Methane Dry Reforming Over Nickel-Based Nanocatalysts Using Surfactant-Assisted or Polyol Method", "International Journal of Hydrogen Energy", 2014, pp. 17009-17023, vol. 39.

Huang, T., et al., "The Effects ofMgO on the Stability of an Ni-Mo/SBA-15 Catalyst for Carbon Dioxide Reforming of Methane", "Energy Sources, Part A; Recovery, Utilization, and Environmental Effects", 2015, pp. 111-117, vol. 37, No. 2, Publisher: Taylor & Francis.

Kawi, S., et al., "Progress in Synthesis of Highly Active and Stable Nickel-Based Catalysts for Carbon Dioxide Reforming of Methane", "Chemsuschem", 2015, pp. 3556-3575, vol. 8, No. 21, Publisher: Wiley Online Library.

Pakhare, D., et al., "A review of dry (CO2) reforming of methane over noble metal catalysts", "Chem. Soc. Rev", 2014, pp. 7813-7837, vol. 43, No. 22, Publisher: The Royal Society of Chemistry.

Quincoces, C.E., et al., "CO2 Reforming of CH4 Over Mo Promoted Nickel-Based Catalysts", "Studies in Surface Science and Catalysis", 2000, pp. 3681-3686, vol. 130, Publisher Elsevier Science B.V.

Usman, M., et al., "Dry reforming of methane: Influence of process parameters-A review", "Renewable and Sustainable Energy Reviews", 2015, pp. 710-744, vol. 45, Publisher: Elsevier.

Usman, M., et al., "Microemulsion based synthesis of Ni/MgO catalyst for dry reforming of methane", "RSC Advances", 2016, pp. 38277-38289, vol. 6, Publisher: The Royal Society of Chemistry.

Xiao, T., et al., "Effect of molybdenum additives on the performance of supported nickel catalysts for methane dry eforming", "Applied Catalysis", 2003, pp. 225-235, vol. 253, No. 1, Publisher: Elsevier.

Xie, T., et al., "Immobilizing Ni nanoparticles to mesoporous silica with size and location control via a polyol-assisted route for coking- and sintering-resistant dry reforming methane", "Chem. Commun.", 2014, pp. 7250-7253, vol. 50, Publisher: The Royal Society of Chemistry.

* cited by examiner

DRY REFORMING CATALYST USING METAL OXIDE SUPPORT, AND METHOD FOR PREPARING SYNTHETIC GAS BY USING SAME

CROSS-REFERENCE TO RELATED APPLICATIONS

This application is a U.S. national phase under the provisions of 35 U.S.C. § 371 of International Patent Application No. PCT/KR17/08486 filed Aug. 7, 2017, which in turn claims priority of Korean Patent Application No. 10-2016-0100271 filed Aug. 5, 2016 and priority of Korean Patent Application No. 10-2017-009-9675 filed Aug. 7, 2017. The disclosures of such International Patent Application No. PCT/KR17/08486, Korean Patent Application No. 10-2016-0100271, and Korean Patent Application No. 10-2017-009-9675 are hereby incorporated herein by reference in their respective entireties, for all purposes.

TECHNICAL FIELD

The present invention relates to a dry reforming catalyst comprising a metal oxide support and a method of producing a synthetic gas using the same, and more particularly to a catalyst in which active material nanoparticles whose surface is covered with a surfactant are dispersed uniformly on the surface of metal oxide and which is stable even at high temperature and exhibits high activity, and a method of producing a synthetic gas using the same.

BACKGROUND ART

An increase in the concentration of carbon dioxide in the atmosphere causes various problems. Hence, researches to convert carbon dioxide into useful substances have been actively conducted all over the world. In particular, the dry reforming reaction of methane is a reaction that produces an industrially useful synthetic gas (a mixture of hydrogen and carbon monoxide) by reacting carbon dioxide with methane at high temperature in the presence of a catalyst, and has been widely studied worldwide ($CH_4 + CO_2 2H_2 + 2CO$, $\Delta H°_{298} = 247.3$ kJ/mol). The thus produced synthetic gas can be applied directly to reactions for synthesis of various chemical substances or hydrocarbons, and thus has a high added value. Despite this advantage, it has not been put to practical use due to the instability of the catalyst and the low activity thereof. The dry reforming reaction of methane shows higher conversion rate as temperature increases, and hence the reaction should be carried out at a temperature of 600° C. or higher in the presence of a catalyst in order to obtain a high-purity product. However, when the catalyst is exposed to a high temperature for a long time, the active metal is sintered to reduce its active surface, or the surface of the active metal is covered with carbon as a side reaction product on the surface, and thus the activity generally tends to decrease with time. In general, the use of precious metals reduces the degree of side reactions and sintering, and thus can maintain catalyst stability over a long period of time. However, since these precious metals are highly expensive, various attempts have been made to synthesize catalysts using inexpensive metals (Pakhare, D. et al., *Chem Soc Rev* 2014, 43 (22), 7813-7837; Xie, T. et al., *Chem Commun* 2014, 50 (55), 7250-7253; Kawi, S. et al., *Chemsuschem* 2015, 8 (21), 3556-3575).

Accordingly, the present inventors have made extensive efforts to solve the above-described problems, and as a result, have found that when nickel and molybdenum together with magnesium oxide are used in catalyst synthesis, a catalyst that exhibits high activity and stability over a long period of time without being deactivated even at high temperature can be prepared without having to use a precious metal can be prepared, and a synthetic gas can be produced using the catalyst, thereby completing the present invention.

SUMMARY OF THE INVENTION

It is an object of the present invention to provide a catalyst that exhibits high activity and stability for a long period time without being deactivated even at a high temperature, and a method of preparing the same.

Another object of the present invention is to provide a method of producing a synthetic gas using the catalyst.

To achieve the above object, the present invention provides a dry reforming catalyst in which an active material is impregnated on the surface of a metal oxide support and the active material is surrounded by a surfactant.

The present invention also provides a method of preparing a catalyst, comprising: (a) obtaining a mixture by dissolving an active material precursor, a metal oxide support and a surfactant in a polyol solvent; and (b) preparing a catalyst in which the active material is impregnated on the surface of the metal oxide support by adding a reducing agent to the mixture.

The present invention also provides a method for dry reforming of methane, the method comprises producing a synthetic gas composed of hydrogen and carbon monoxide by reacting methane with carbon dioxide at 600 to 800° C. in the presence of the dry reforming catalyst.

BEST MODE FOR CARRYING OUT THE INVENTION

Unless defined otherwise, all the technical and scientific terms used herein have the same meaning as those generally understood by one of ordinary skill in the art to which the invention pertains. Generally, the nomenclature used herein and the experiment methods, which will be described below, are those well-known and commonly employed in the art.

In the present invention, it could be confirmed that a catalyst showing no decrease in activity could be prepared by a novel method instead of a general catalyst synthesis method such as wet impregnation, calcination or reduction, and that when a dry reforming catalyst was prepared in which an active material is impregnated on the surface of a metal oxide support and the active material is surrounded by a surfactant, the surfactant on the surface of the active material prevented the active material from being sintered and the active material surface from being covered with carbon, so that the dry reforming catalyst could exhibit high activity at high temperature for a long period of time without having to use a precious metal.

Figure 1:
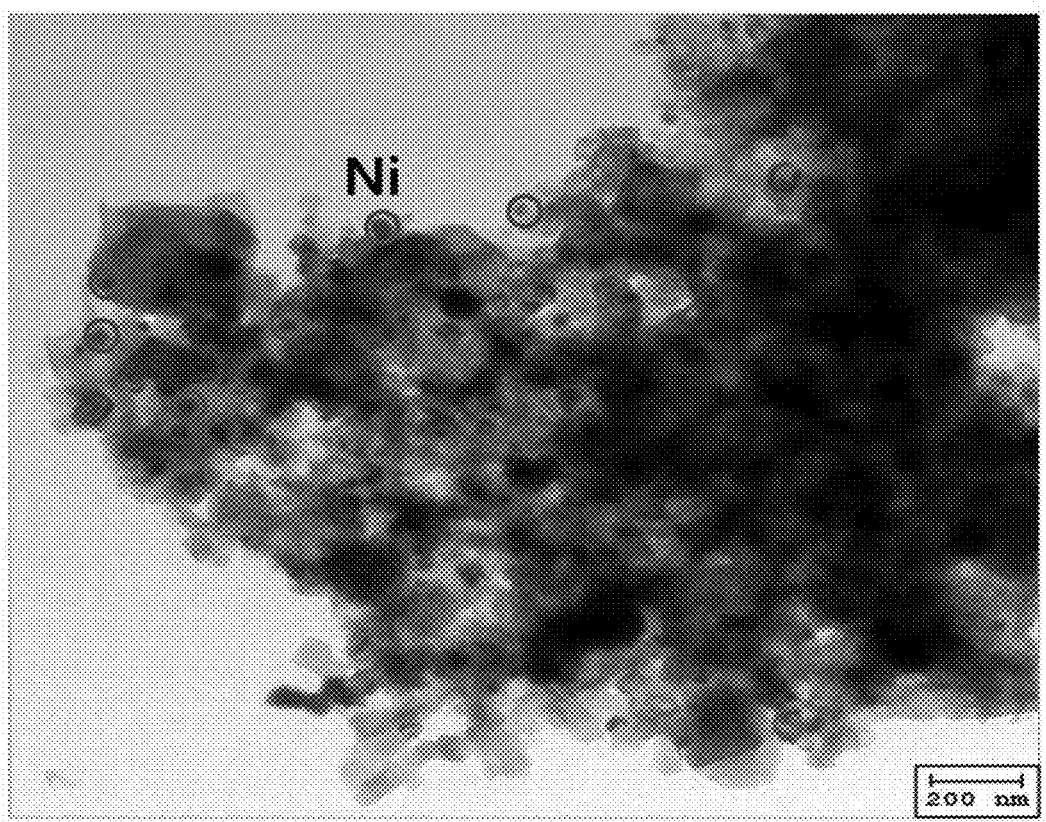
FIG. 1 is a transmission electron microscope (TEM) image of a catalyst prepared in Example of the present invention.
Figure 2:
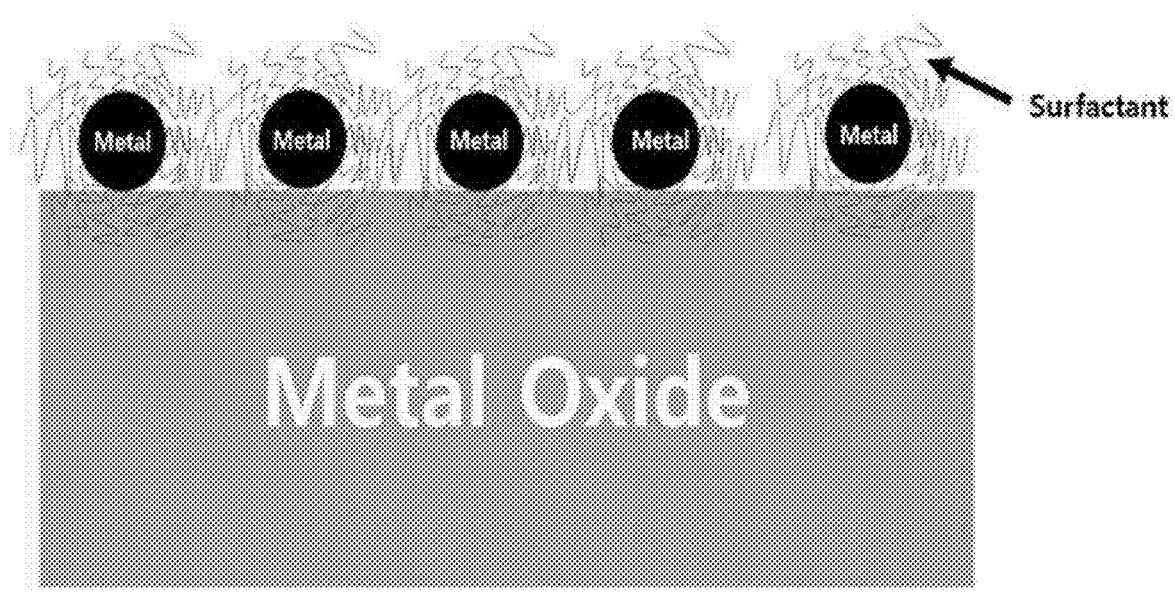
FIG. 2 is a schematic view of a dry reforming catalyst according to the present invention.

Therefore, in one aspect, the present invention is directed to a dry reforming catalyst in which an active material is impregnated on the surface of a metal oxide support and the active material is surrounded by a surfactant. The dry reforming catalyst according to the present invention is schematically shown in FIG. 2.

In another aspect, the present invention is directed to a method of preparing a dry reforming catalyst, comprising: (a) obtaining a mixture by dissolving an active material precursor, a metal oxide support and a surfactant in a polyol solvent; and
(b) preparing a catalyst in which the active material is impregnated on the surface of the metal oxide support by adding a reducing agent to the mixture.

In the present invention, the metal oxide may be one or more selected from the group consisting of $ZrO_2$, MgO, $TiO_2$, $Al_2O_3$, $SiO_2$, $CrO_2$, $Fe_2O_3$, $Fe_3O_4$, CuO, ZnO, CaO, $Sb_2O_4$, $Co_3O_4$, $Fe_3O_4$, $Pb_3O_4$, $Mn_3O_4$, $Ag_2O_2$, $U_3O_8$, $Cu_2O$, $Li_2O$, $Rb_2O$, $Ag_2O$, $Tl_2O$, BeO, CdO, TiO, $GeO_2$, $HfO_2$, $PbO_2$, $MnO_2$, $TeO_2$, $SnO_2$, $La_2O_3$, $Fe_2O_3$, $CeO_2$, $WO_2$, $UO_2$, $ThO_2$, $TeO_2$ and $MoO_3$, and $SiO_2$, $Al_2O_3$, MgO, $CeO_2$ or $La_2O_3$ is preferably used as the metal oxide, but is not limited thereto.

In addition, the active material may be one or more selected from the group consisting of an active metal such as nickel (Ni), cobalt (Co), ruthenium (Ru), palladium (Pd), iridium (Ir), platinum (Pt), and rhodium (Rh), and molybdenum carbide ($Mo_2C$).

The active material may further comprise a promoter such as molybdenum (Mo). Molybdenum (Mo) itself does not exhibit activity, but acts as a promoter that facilitates the distribution of the active material or change the energy state of the active material to further improve the efficiency of the catalyst. Preferably, nickel (Ni) and/or molybdenum (Mo) is used as the active material, but is not limited thereto.

In addition, the surfactant may be one or more selected from the group consisting of polyvinylpyrrolidone (PVP), oleylamine, oleic acid, benzyl ether, trioctylphosphine, octadecylamine, hexadecylamine, cetyl trimethylammonium bromide (CTAB), polyethyleneglycol (PEG), 1,2-hexadecanediol, and 1-octadecene. Preferably, polyvinylpyrrolidone (PVP) is used as the surfactant, but is not limited thereto.

The reducing agent used in the method of preparing the dry reforming catalyst of the present invention may be one or more selected from the group consisting of hydrazine, $NaBH_4$, $LiAlH_4$, diisobutylaluminum hydride (DIBAL-H), and diborane. Preferably, hydrazine is used as the reducing agent, but is not limited thereto.

The polyol solvent used in the method of preparing the dry reforming catalyst of the present invention may be one or more selected from the group consisting of ethylene glycol (EG), diethylene glycol (DEG), triethylene glycol (TrEG), polyethylene glycol (PEG), propanediol (PDO), butanediol (BD), pentanediol (PD), glycerol (GLY), and pentaerythritol (PE).

The weight ratio of the active material:the magnesium oxide support: the surfactant may be 0.01 to 40:59.6 to 99.5:0.04. In this range, the catalyst advantageously has high activity and long-lasting stability, and when the weight ratio is out of this range, a problem arises in that the activity of the catalyst readily decreases as the reaction progresses.

Figure 3:
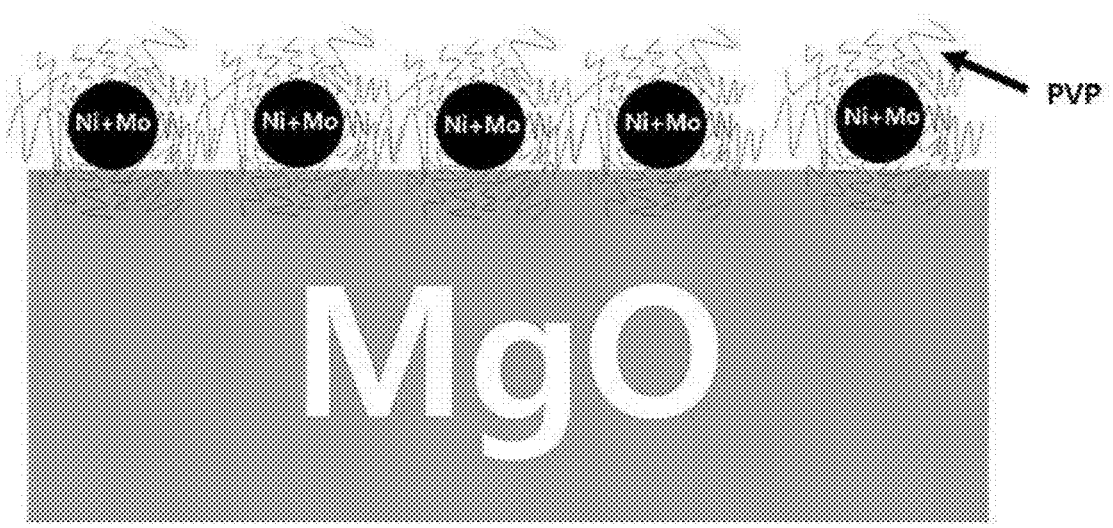
FIG. 3 is a schematic view of a catalyst prepared in Example 1 of the present invention.

According to one preferred embodiment of the present invention, there is provided a nickel-molybdenum dry reforming catalyst in which nickel and molybdenum are impregnated on the surface of a magnesium oxide support and the nickel is surrounded by a surfactant, the catalyst having a nickel content of 0.01 to 100 wt % and a molybdenum content of 99.9 to 0 wt %. The nickel-molybdenum dry reforming catalyst according to the present invention is schematically shown in FIG. 3.

Furthermore, the catalyst according to the present invention may have a formula of $Ni_{10}Mo_2@MgO$.

A precursor of nickel in the method of preparing the nickel-molybdenum dry reforming catalyst of the present invention may be one or more selected from the group consisting of $NiCl_2$, $NiCl_2.6H_2O$, $Ni(NO_3)_2$, $NiSO_4$, $(NH_4)_2Ni(SO_4)_2.6H_2O$, $Ni(OCOCH_3)_2.4H_2O$, $NiBr_2$, $NiCO_3$, $NiF_2$, $NiI_2$, $NiC_2O_4.2H_2O$, and $Ni(ClO_4)_2.6H_2O$, and a precursor of molybdenum may be one or more selected from the group consisting of $Mo(CO)_6$, $MoO_3$, $Na_2MoO_4$, $CaMoO_4$, $ZnMoO_4$, and $(NH_4)_6Mo_7O_{24}.4H_2O$.

The prepared dry reforming catalyst may have a pore area of 0 to 5,000 $m^2/g$, preferably 10 to 3,000 $m^2/g$, and a conversion of 95 to 98%, and may be used for the dry reforming reaction of methane. Within the range of the pore area, the active metal may be supported. The larger the pore area, the more active material may be supported.

In still another aspect, the present invention is directed to a method for dry reforming of methane, comprising producing a synthetic gas composed of hydrogen and carbon monoxide by reacting methane with carbon dioxide at 600 to 800° C. in the presence of the dry reforming catalyst.

The method for dry reforming of the methane may be performed at a high pressure of 1 to 30 bar, preferably 1 to 20 bar, more preferably 1 to 16 bar.

EXAMPLES

Hereinafter, the present invention will be described in further detail with reference to examples. It will be obvious to a person having ordinary skill in the art that these examples are for illustrative purposes only and are not to be construed to limit the scope of the present invention.

Example 1: Preparation of $Ni_{10}Mo_2@MgO$ Catalyst

Ethylene glycol (Samchun Chemicals), nickel chloride hydrate ($NiCl_26H_2O$, Samchun Chemicals), ammonium heptamolybdate tetrahydrate $(NH_4)_6Mo_7O_{24}.4H_2O$, Samchun Chemicals) and polyvinylpyrrolidone (Sigma-Aldrich) were used. NaOH (Samchun Chemicals), hydrazine (Sigma Aldrich) and magnesium oxide were used as dry ice and magnesium metal.

First, 0.404 g of a nickel precursor and 36 mg of a molybdenum precursor were dissolved in 1 mL of water and 24 mL of ethylene glycol, and then 0.38 g of PVP was added thereto, followed by stirring. 0.9 g of magnesium oxide was added to the solution which was then stirred, after which the temperature of the solution was increased to 80° C. To the solution, a hydrazine solution (1.7 g of hydrazine/5 mL of ethylene glycol) was added, and when the solution changed color, a solution of 136 mg of NaOH in 10 mL of ethylene glycol was added. As the color of the solution gradually became black, nickel and molybdenum ions were reduced and impregnated on the surface of the magnesium oxide. After 1 hour of stirring, the solution was washed with water and dried, thereby obtaining a catalyst.

Example 2: Characterization of Reaction for Producing Synthetic Gas Using Catalyst The synthesized catalyst was analyzed by TEM, and as a result, it was confirmed that nickel and molybdenum were distributed uniformly on the surface of the magnesium oxide and that the active material metal nickel was surrounded by the surfactant PVP.

Figure 4:
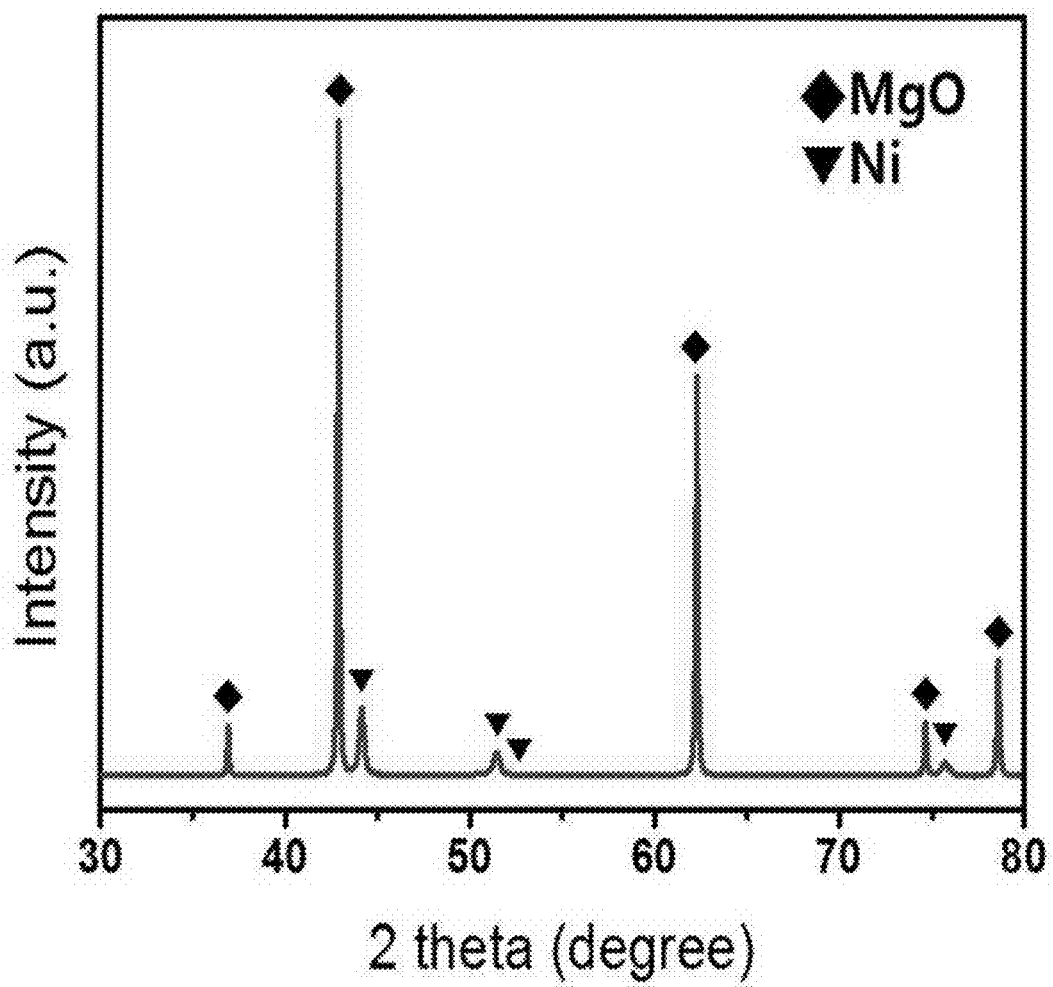
FIG. 4 is an X-ray diffraction image of a catalyst prepared in Example 1 of the present invention.
Figure 5:
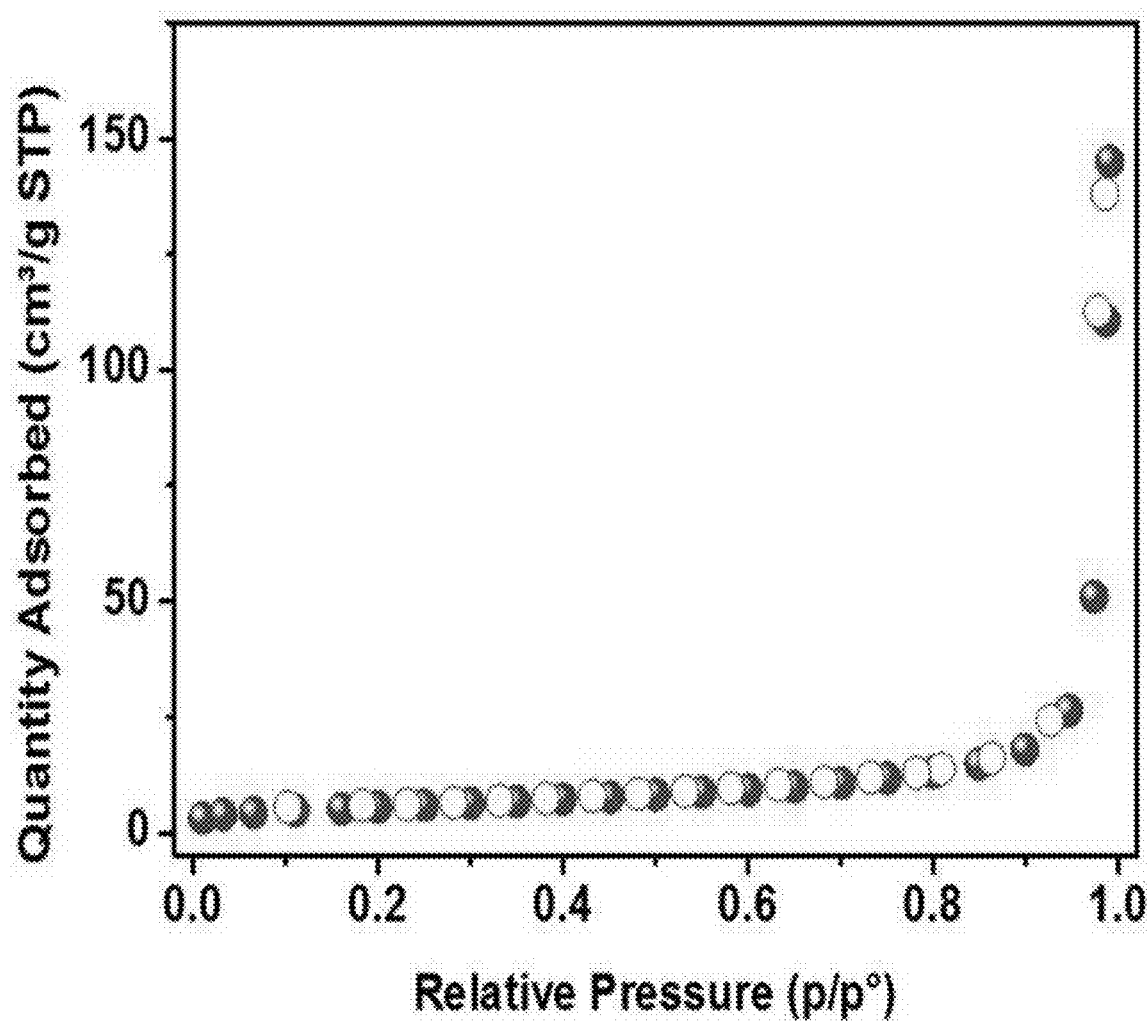
FIG. 5 is a nitrogen adsorption curve of a catalyst prepared in Example 1 of the present invention.

FIG. 4 shows the results of measuring X-ray diffraction. As shown in FIG. 4, Ni and MgO were found. The concentration of Ni was relatively low, and thus the intensity of the peak was relatively weaker than that of MgO. Mo was not detected in the results of XRD due to its low concentration. To determine the exact metal contents, the elements contained in the catalyst were analyzed by ICP and elemental analysis. As a result, as shown in Table 1 below, it was confirmed that the content of nickel was 7.09% and the content of molybdenum was 1.55%. In addition, PVP used as the surfactant covered the surface of the active material, and thus the detected contents of carbon and nitrogen were 4.42% and 0.15%, respectively. To measure the porosity, the catalyst was adsorbed with liquid nitrogen at 77K, and the adsorbed quantity of the liquid nitrogen was measured. As a result, it was shown that the porosity of the catalyst was not high (20 m$^2$/g), but the activity of the catalyst was high (FIG. 5).

Figure 6:
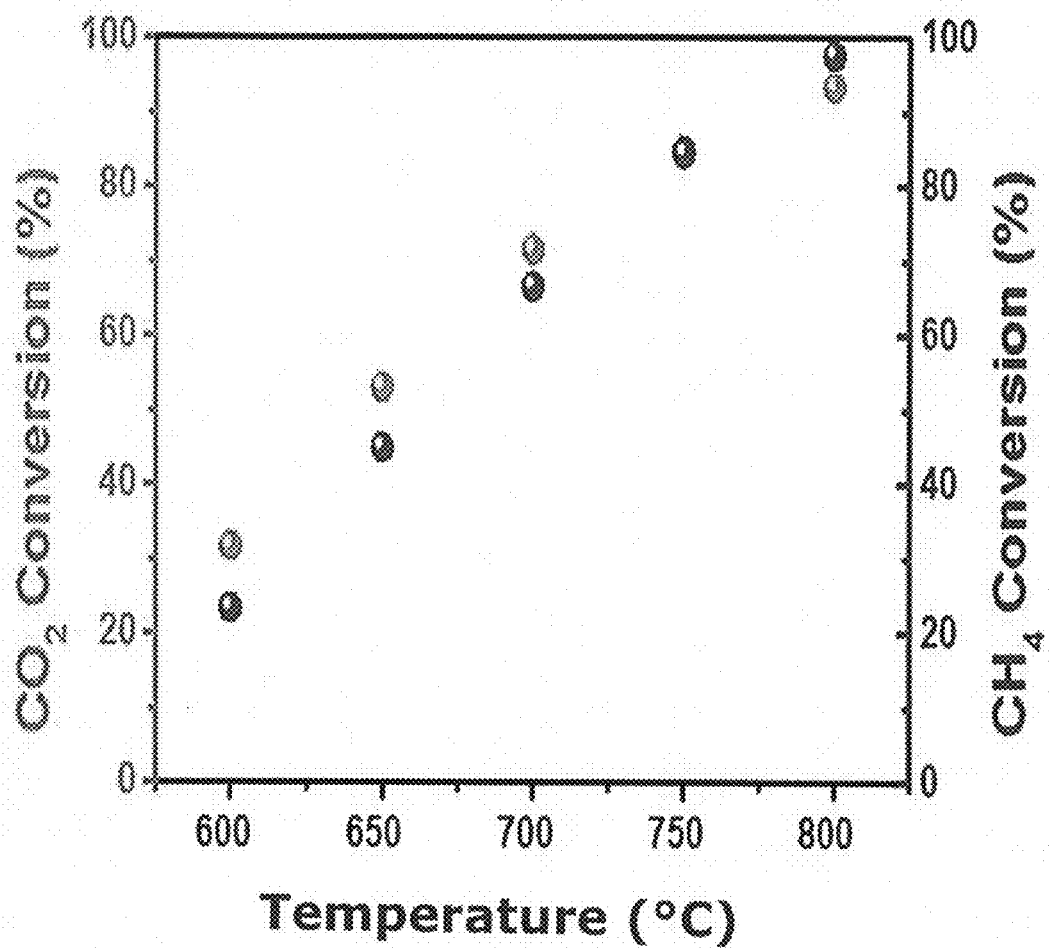
FIG. 6 shows the results of measuring the temperature-dependent reaction activity of a catalyst prepared in Example 1.

In order to examine the effect of temperature on the catalyst, 50 mg of the synthesized catalyst was placed in a quartz tube reactor, and the temperature-dependent activity of the catalyst was measured while changing the reaction temperature (FIG. 6). The operating temperature was 600 to 800° C. The composition of reactants was $CO_2$:$CH_4$:He=1:1:8, and the flow rate was 50 mL/min. The weight hourly space velocity (WHSV) was 60 L/$g_{cat}$h. The conversion was measured by gas chromatography (Simadzu, GC Tracera). As shown in FIG. 6, the conversion increased with increasing temperature, and the catalyst showed a $CO_2$ conversion of 95% and a $CH_4$ conversion of 98% at 800° C.

Figure 7:
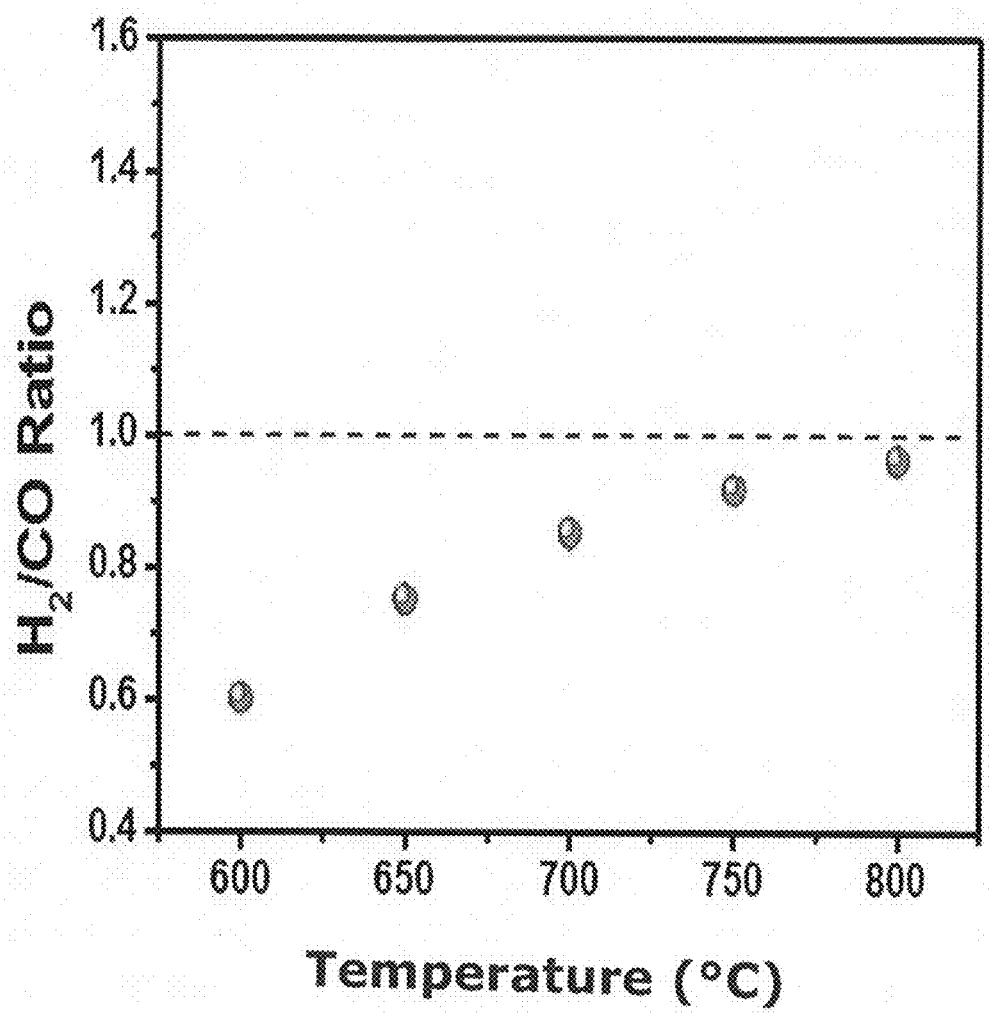
FIG. 7 shows the results of measuring the temperature-dependent conversion rate of a catalyst prepared in Example 1.

As shown in FIG. 7, it could be seen that the $H_2$/CO ratio of the product increased with increasing temperature and reached 0.96, which approaches a theoretical value of 1, at 800° C.

Figure 8:
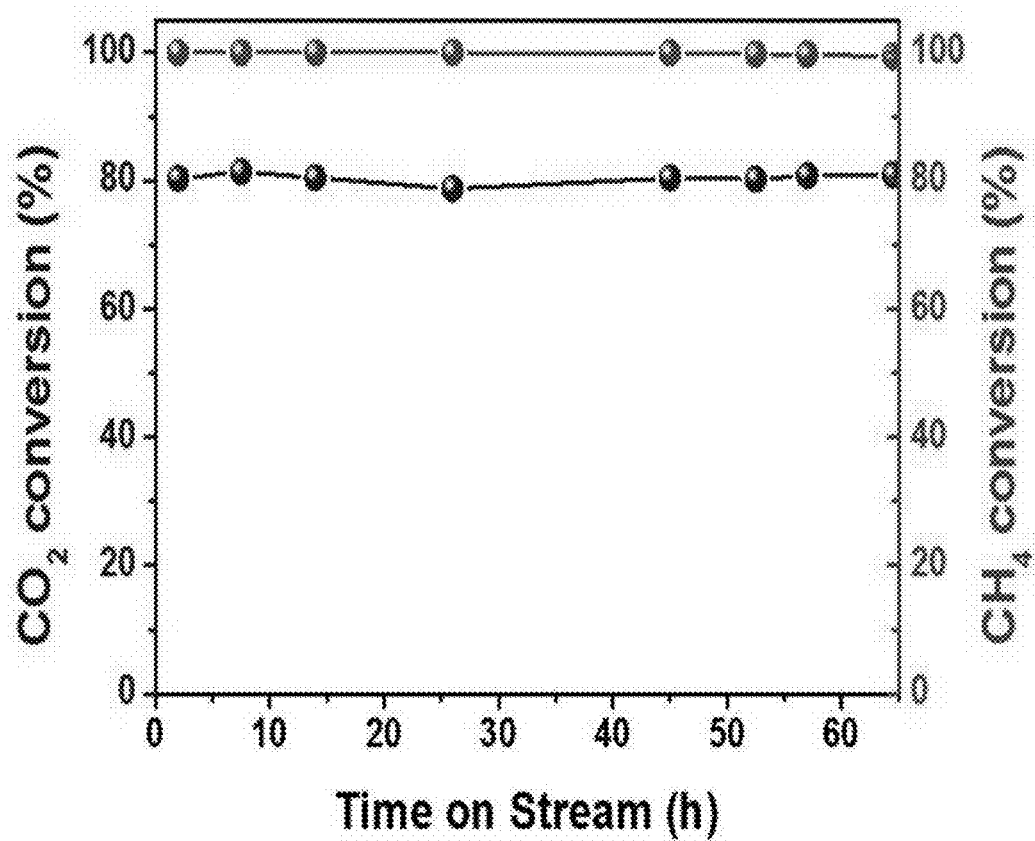
FIG. 8 shows the results of measuring the time-dependent stability of a catalyst prepared in Example 1.

In order to examine the stability of the catalyst during a reaction, the time-dependent conversion of the reactants was measured at a high temperature of 800° C. (FIG. 8). 100 mg of the catalyst was used for a reactant composition of $CO_2$:$CH_4$:He=1:1:8 at a flow rate of 20 mL/min, and the conversion rate of the reactants was measured. The WHSV was 12 L/$g_{cat}$h. As a result, the catalyst showed constant performance without a change in the conversion rate for 65 hours. The results obtained after 65 hours are not significantly different from the results of the first measurement, suggesting that the catalyst is stable even when it is used in the reaction for 65 hours or more.

TABLE 1

|  | Ni | Mo | Mg | C | N | H | O |
| --- | --- | --- | --- | --- | --- | --- | --- |
| $Ni_{10}Mo_2$@MgO | 7.09% | 1.55% | 40.22% | 4.42% | 0.15% | 1.51% | 31% |

In addition, in order to examine the stability of the catalyst during a reaction at high pressure, the conversion rate of reactants was measured at a pressure of 1 to 16 bar (Table 2). 3.7 g of the catalyst was used under the condition of $CO_2$:$CH_4$:He=41.66 mL/min:41.66 mL/min:16.68 mL/min, and the conversion rate of the reactants was measured. It was confirmed that when methane and carbon dioxide were reacted at high pressure in the presence of the dry reforming catalyst, they could be converted to a synthetic gas composed of hydrogen and carbon monoxide.

TABLE 2

| Temperature (° C.) | 780~850 | 780~850 | 780~850 | 780~850 | 800~850 | 800~850 | 800~850 | 800~850 | 800~850 | 800~850 | 800~850 | 800~850 |
| --- | --- | --- | --- | --- | --- | --- | --- | --- | --- | --- | --- | --- |
| Pressure (bar) | 1 | 3 | 3 | 10 | 10 | 10 | 10 | 10 | 10 | 10 | 10 | 16 |
| $CH_4$ | 29.39 | 7.09 | ~0.5 | 5.6 | 7.99 | 8.03 | 10.39 | 9.75 | 9.56 | 11.53 | 11.47 | 7.23 |
| $N_2$ | 14.5 | 14.17 | 14.49 | 15.06 | 16.02 | 15.84 | 16.87 | 16.5 | 16.46 | 17.44 | 17.88 | 20.53 |
| $CO_2$ | 26.29 | 10.68 | 11.16 | 22.25 | 24.2 | 23.56 | 28.14 | 27.13 | 26.27 | 29.54 | 31.52 | 36.84 |
| CO | 18.81 | 38.71 | 41.36 | 37.52 | 34.3 | 35.68 | 29.09 | 31.32 | 32.24 | 27.72 | 26.77 | 25.97 |
| $H_2$ | 10.98 | 29.33 | 32.97 | 19.54 | 17.47 | 16.88 | 15.5 | 15.25 | 14.98 | 13.74 | 12.34 | 9.42 |

INDUSTRIAL APPLICABILITY

The dry reforming catalyst according to the present invention can be prepared by a novel method instead of a general catalyst synthesis method such as wet impregnation, calcination or reduction, in which a catalyst shows no activity. In addition, the surfactant on the surface of the active material prevents the active material from being sintered and the active material surface from being covered with carbon, so that the dry reforming catalyst can exhibit high activity at high temperature and pressure for a long period of time even without having to use a precious metal, and thus, it can be as a catalyst for the dry reforming reaction. In addition, the dry reforming catalyst is useful for the production of a high value-added chemical substance, because the ratio of hydrogen to carbon monoxide in the product is about 1:1.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A dry reforming catalyst in which an active material is impregnated on a surface of a metal oxide support and the active material is surrounded by a surfactant,
   wherein the weight ratio of the active material: the metal oxide support: the surfactant is 0.01 to 40:59.6 to 99.5:0.04;
   the metal oxide is one or more selected from the group consisting of MgO, $TiO_2$, $Al_2O_3$, $SiO_2$, $CrO_2$, $Fe_2O_3$, $Fe_3O_4$, CuO, ZnO, CaO, $Sb_2O_4$, $Co_3O_4$, $Pb_3O_4$, $Mn_3O_4$, $Ag_2O_2$, $U_3O_8$, $Cu_2O$, $Li_2O$, $Rb_2O$, $Ag_2O$, $Tl_2O$, BeO, CdO, TiO, $GeO_2$, $HfO_2$, $PbO_2$, $MnO_2$, $TeO_2$, $SnO_2$, $La_2O_3$, $CeO_2$, $WO_2$, $UO_2$, $ThO_2$, $TeO_2$ and $MoO_3$;
   the active material is one or more selected from the group consisting of nickel (Ni), cobalt Co), ruthenium (Ru), palladium (Pd), iridium (Ir), platinum (Pt), rhodium (Rh) and molybdenum carbide ($Mo_2C$);
   the active material further comprises a promoter; and
   the promoter is Molybdenum (Mo).

2. The dry reforming catalyst of claim 1, wherein the dry reforming catalyst has a pore area of greater than 0 to 5,000 $m^2$/g and a $CO_2$ and $CH_4$ conversion of 95 to 98%.

3. The dry reforming catalyst of claim 1, wherein the catalyst is used for the dry reforming reaction of methane.

4. A method of preparing a dry reforming catalyst of claim 1, comprising:
   (a) obtaining a mixture by dissolving an active material precursor, a metal oxide support and a surfactant in a polyol solvent; and
   (b) preparing a catalyst in which the active material is impregnated on the surface of the metal oxide support by adding a reducing agent to the mixture.

5. The method of preparing a dry reforming catalyst of claim 4, wherein the active material is nickel (Ni).

6. The method of preparing a dry reforming catalyst of claim 4, wherein a precursor of nickel is one or more selected from the group consisting of $NiCl_2$, $NiCl_2.6H_2O$, $Ni(NO_3)_2$, $NiSO_4$, $(NH_4)_2Ni(SO_4)_2.6H_2O$, $Ni(OCOCH_3)_2.4H_2O$, $NiBr_2$, $NiCO_3$, $NiF_2$, $NiI_2$, $NiC_2O_4.2H_2O$, and $Ni(ClO_4)_2.6H_2O$.

7. The method of preparing a dry reforming catalyst of claim 4, wherein the surfactant is one or more selected from the group consisting of polyvinylpyrrolidone (PVP), oleylamine, oleic acid, benzyl ether, trioctylphosphine, octadecylamine, hexadecylamine, cetyl trimethylammonium bromide (CTAB), polyethyleneglycol (PEG), 1,2-hexadecanediol and 1-octadecene.

8. The method of preparing a dry reforming catalyst of claim 4, wherein the reducing agent is one or more selected from the group consisting of hydrazine, $NaBH_4$, $LiAlH_4$, diisobutylaluminum hydride (DIBAL-H) and diborane.

9. A method of dry reforming methane, the method comprises producing a synthetic gas composed of hydrogen and carbon monoxide by reacting methane with carbon dioxide at 600 to 800° C. in the presence of the dry reforming catalyst of claim 1.

10. The method of dry reforming methane of claim 9 wherein the method is performed at a pressure of 1 to 30 bar.

* * * * *

UNITED STATES PATENT AND TRADEMARK OFFICE
CERTIFICATE OF CORRECTION

PATENT NO. : 11,618,015 B2
APPLICATION NO. : 16/321028
DATED : April 4, 2023
INVENTOR(S) : Cafer T. Yavuz et al.

It is certified that error appears in the above-identified patent and that said Letters Patent is hereby corrected as shown below:

In the Specification

Column 4, Line 21, "$NiCl_2.6H_2O$" should be -- $NiCl_2 \cdot 6H_2O$ --.

Column 4, Lines 21-22, "$(NH_4)_2Ni(SO_4)_2.6H_2O$" should be -- $(NH_4)_2Ni(SO_4)_2 \cdot 6H_2O$ --.

Column 4, Lines 22, "$Ni(OCOCH_3)_2.4H_2O$" should be -- $Ni(OCOCH_3)_2 \cdot 4H_2O$ --.

Column 4, Line 23, "$NiC_2O_4.2H_2O$" should be -- $NiC_2O_4 \cdot 2H_2O$ --.

Column 4, Line 23, "$Ni(CLO_4)_2.6H_2O$" should be -- $Ni(ClO_4)_2 \cdot 6H_2O$ --.

Column 4, Line 26, "$(NH_4)_6Mo_7O_{24}.4H_2O$" should be -- $(NH_4)_6Mo_7O_2 \cdot 4H_2O$ --.

Column 4, Line 54, "$(NH_4)_6Mo_7O_{24}.4H_2O$" should be -- $((NH_4)_6Mo_7O_2 \cdot 4H_2O$ --.

Column 7, Line 39, "cobalt Co)" should be -- cobalt (Co) --.

Column 8, Line 19, "$NiCl_2.6H_2O$" should be -- $NiCl_2 \cdot 6H_2O$ --.

Column 8, Line 20, "$(NH_4)_2Ni(SO_4)_2.6H_2O$" should be -- $(NH_4)_2Ni(SO_4)_2 \cdot 6H_2O$ --.

Column 8, Lines 20-21, "$Ni(OCOCH_3)_2.4H_2O$" should be -- $Ni(OCOCH_3)_2 \cdot 4H_2O$ --.

Column 8, Line 21, "$NiC_2O_4.2H_2O$" should be -- $NiC_2O_4 \cdot 2H_2O$ --.

Column 8, Line 22, "$Ni(ClO_4)_2.6H_2O$" should be -- $Ni(ClO_4)_2 \cdot 6H_2O$ --.

Signed and Sealed this
Thirtieth Day of May, 2023

Katherine Kelly Vidal
*Director of the United States Patent and Trademark Office*